United States Patent

Kato et al.

Patent Number: 5,923,632
Date of Patent: Jul. 13, 1999

[54] OPTICAL PICK-UP DEVICE FOR A MULTI-LAYER RECORDING MEDIUM WITH A PHOTODETECTOR ARRANGEMENT FOR FOCUSING AND TRACKING CONTROL

[75] Inventors: Yoshiaki Kato, Tokyo; Atsushi Fukumoto, Kanagawa, both of Japan

[73] Assignee: Sony Corporation, Japan

[21] Appl. No.: 08/700,414

[22] PCT Filed: Dec. 28, 1995

[86] PCT No.: PCT/JP95/02770

§ 371 Date: Aug. 23, 1996

§ 102(e) Date: Aug. 23, 1996

[87] PCT Pub. No.: WO96/20473

PCT Pub. Date: Jul. 4, 1996

[30] Foreign Application Priority Data

Dec. 28, 1994 [JP] Japan .................................... 6-329162

[51] Int. Cl.$^6$ ....................................................... G11B 7/00
[52] U.S. Cl. ........................ 369/112; 369/94; 369/44.37
[58] Field of Search .................................... 369/109, 110, 369/112, 93, 94, 44.14, 44.32, 44.37, 44.38

[56] References Cited

U.S. PATENT DOCUMENTS

| | | | |
|---|---|---|---|
| 5,097,464 | 3/1992 | Nishiuchi et al. . | |
| 5,563,873 | 10/1996 | Ito et al. .............................. | 369/94 X |

FOREIGN PATENT DOCUMENTS

| | | |
|---|---|---|
| 0 521 619 A2 | 1/1932 | European Pat. Off. . |
| 0 414 380 A2 | 2/1991 | European Pat. Off. . |
| 468 468 A2 | 1/1992 | European Pat. Off. . |
| 521 619 A2 | 1/1993 | European Pat. Off. . |
| 3-54740 | 3/1991 | Japan . |
| 92103211 | 12/1992 | Japan . |
| 5-151609 | 6/1993 | Japan . |
| 218427 | 1/1994 | Japan . |

*Primary Examiner*—Paul W. Huber
*Attorney, Agent, or Firm*—Ronald P. Kananen

[57] ABSTRACT

An optical pick-up device invention is adapted according to the present invention to reproduce an information signal recorded on a multi-layer optical disc having a plurality of information signal storage layers on which information signals are stored. The optical pick-up device includes a light source for emitting a light beam, an optical means for dividing the light beam emitted from the light source into three separate beams composed of a main beam and first and second side beams and radiating these beams onto the multi-layer optical disc, a main beam-receiving member for receiving the main beam reflected from the multi-layer optical disc, first and second side beam-receiving members for receiving the first and second side beams reflected from the multi-layer optical disc, respectively, and a means for outputting a detection signal indicative of a quantity of light in response to the light quantity received by the main beam-receiving member, the first side beam-receiving member and the second side beam-receiving member. The first side beam-receiving member and the second side beam-receiving member are spaced a given distance apart from the main beam-receiving member so that no interference with the main beam reflected from an unfocused information signal storage layer of the multi-layer optical disc is caused, so that the light beam reflected from the unfocused information signal storage layer of the multi-layer optical disc does not have any influence on function of the device.

20 Claims, 10 Drawing Sheets

OPTICAL PICK-UP DEVICE FOR A MULTI-LAYER RECORDING MEDIUM WITH A PHOTODETECTOR ARRANGEMENT FOR FOCUSING AND TRACKING CONTROL

This application is a 371 of PCT/JP95/02770 filed Dec. 28, 1995.

TECHNICAL FIELD

The present invention relates to an optical pickup device for use in a recording and/or reproducing apparatus capable of recording an information signal on a so-called multi-layer optical disc having a plurality of information layers and/or reproducing the information signal from respective information storage layers of the multi-layer optical disc.

BACKGROUND ART

Optical pickup devices used in conventional recording and/or reproducing apparatuses in which an optical disc is used as a recording medium, includes a semiconductor laser as a light source for emitting a light beam, a collimator lens which is disposed between the semiconductor laser and the optical disc and whose optical axis is aligned with optical axes of the semiconductor laser and the optical disc, a diffraction grating, a polarizing beam splitter and an objective lens. The optical pickup device further includes a photodetector for receiving a light beam from the optical disc, and a focusing lens which is disposed between the photodetector and the polarizing beam splitter and whose optical axis is aligned with optical axes of the photodetector and the polarizing beam splitter.

In such conventional optical pickup devices, the light beam is emitted from the semiconductor laser and transmitted through the polarizing beam splitter and an objective lens so as to be radiated and focused onto an information signal storage layer of the optical disc. The light beam reflected from the optical disc is received by the photodetector.

The optical disc used as a recording medium for a recording and/or reproducing apparatus in which the aforementioned optical pick-up is incorporated and which is adapted to record an information signal thereon and/or reproduce the signal therefrom, generally includes a substrate made of a transparent synthetic resin material such as polycarbonate or polymethyl-methacrylate, an information signal layer formed on a main surface of the substrate, and a protecting layer formed over the information signal layer to protect the layer against chemical erosion or mechanical damage.

Such an optical disc has been produced by using various shaping methods such as a thermal pressure-molding method or a thermal casting method. When subjected to the shaping method, the optical disc is likely to suffer from undesired warpage or corrugation due to a thermal distortion generated therein. Consequently, a dislocation of the information signal storage layer occurs in the direction perpendicular to the main surface of the disc. Further, the circularity of tracks formed on the information signal layer is adversely affected. When the optical disc is rotated to reproduce the information signal stored on the information signal layer, the surface of the information signal layer and the tracks thereon suffer from undesirable oscillation and deflection.

Accordingly, in order to achieve an accurate read-out or reproduction of the information signal stored on a signal recording region of the optical disc without being adversely affected by the oscillation of the optical disc surface and the deflection of the tracks, the optical pickup device is provided with a focusing control function for conducting an adequate focusing adjustment of the objective lens in response to a degree of the eventual oscillation of the surface of the optical disc, and a tracking control function for performing an adequate tracking adjustment of the objective lens so as to follow the oscillation of a signal track formed on the signal recording region of the optical disc.

Meanwhile, there has been a demand for higher density information storage, so that proposals have been made to provide a multi-layer optical disc having a multiple of information signal layers arranged in an overlapped relation to each other. The multi-layer optical disc conventionally known is of a two-layer type having two overlapped information signal layers.

The two-layer type optical disc 5 includes, as shown in FIG. 1, a disc substrate 5C made of a transparent synthetic resin material such as polycarbonate (PC) or polymethylmethacrylate (PMMA), a first information signal storage layer 5A formed on a main surface of the disc substrate 5C, a spacer layer 5D made of a transparent resin material and disposed over the first information signal storage layer, a second information signal storage layer 5B disposed over the first information signal storage layer 5A through the spacer layer 5D, and a protecting layer 5E formed over the second information signal storage layer 5B to protect the second information signal storage layer against mechanical damage and chemical erosion.

In such a two-layer type optical disc, the laser beam emitted from the semiconductor laser is transmitted through the first information signal storage layer 5A and radiated to the second information signal storage layer 5B when the optical pickup device performs a read-out of the information signal from the second information signal storage layer 5B disposed over the first information signal storage layer 5A.

In the optical pickup device used here, the tracking control is carried out by using a 3-spot method in which three light beams are radiated to the optical disc to obtain a tracking control signal. When the information signal stored on the individual information signal storage layers of the multi-layer optical disc is read by means of the optical pickup device which employs the above-mentioned 3-spot method to conduct a tracking control, the following problems are caused. As shown in FIG. 2, a photo-detector used in such an optical pick-up device in which a tracking control is performed by using the 3-spot method, includes a main beam detector 33A for detecting a main beam which is a centrally radiated beam of three separated light beams, and first and second side-beam detectors 33B and 33C disposed on opposite sides of the main beam detector 33A, arranged so as to sandwich the main beam detector 33A therebetween, for detecting side beams radiated on opposite sides of the main beam.

When the information signal stored on the first information signal storage layer 5A of the two-layer type optical disc 5 is read out, the main beam 34A and the first and second side beams 34B and 34C are radiated onto the first information signal storage layer 5A. In the course of the reading-out of the information signal stored on the first information signal storage layer 5A, these light beams are transmitted through the first information signal storage layer 5A and also radiated onto the second information signal storage layer 5B whose information signal is not intended to be read out.

In consequence, the photo-detector of the optical pick-up device receives not only the main beam 34A reflected from the focused first information signal storage layer 5A but also a blooming light component 35A of the main beam, namely a stray light component, reflected from the unfocused information signal storage layer SB. That is, in the optical pick-up device, the main beam 34A and the stray light component 35A having an expanded outer perimeter are radiated together onto the main beam detector 33A in a concentric relation to each other.

Accordingly, in such an optical pick-up device, a part of the stray light component 35A of the main beam radiated on the main beam detector 33A is overlappingly radiated over the side beam detectors 33B and 33C. Thus, when the part of the stray light component 35A of the main beam is radiated over the side-beam detectors 33B and 33C and overlapped with the respective side beams, there occurs direct-current (DC) fluctuation in a tracking error signal, which occasionally makes it impossible to carry out an accurate tracking control.

Consequently, in the optical pick-up device, such an advantage of the 3-spot method that the tracking error signal is not adversely affected by a skew of the disc and a deflection of a view field of the objective lens and therefore does not suffer from D.C. fluctuation, cannot be maintained. Further, when the radiation of a read light beam focused through the objective lens is switched between the information signal storage layers of the two-layer type optical disc, a form of the stray light component 35A of the main beam radiated on the main beam detector 33A is changed.

Accordingly, a ratio of a light quantity of the stray light component 35A of the main beam radiated over the respective side beam detectors 33B and 33C to those of the side beams is also changed, so that the tracking error signal suffers from D.C. offset, thereby causing such a problem that it is no longer possible to perform the accurate tracking control.

Meanwhile, an intensity of the stray light component of each side beam is considerably that of the stray light component of the main beam. In consequence, the influence of the stray light components of the side beams on the main beam detector is negligible and therefore causes no significant problem.

SUMMARY OF THE INVENTION

It is an object of the present invention to provide an optical pick-up device capable of accurately reproducing an information signal recorded on a plurality of information signal storage layers of a multi-layer optical disc.

It is another object of the present invention to provide an optical pick-up device capable of conducting a tracking control with a high accuracy when an information signal stored on a multi-layer optical disc is read out, whereby an accurate reproduction of the information signal can be achieved.

In order to accomplish the afore-mentioned objects, in accordance with the present invention, there is provided an optical pick-up device which includes a light source for emitting a light beam to be radiated toward the multi-layer optical disc having a plurality of information signal storage layers which are arranged in a overlapped manner and on each of which a desired information signal is recorded, an optical means for dividing the light beam emitted from the light source into three separate beams composed of a main beam and first and second side beams and radiating these beams onto the multi-layer optical disc, a main beam-receiving member for receiving the main beam reflected from the multi-layer optical disc, a first side beam-receiving member for receiving the first side beam reflected from the multi-layer optical disc, a second side beam-receiving member for receiving the second side beam reflected from the multi-layer optical disc, and a means for outputting a detection signal indicative of a quantity of light in response to the light received by the main beam-receiving member, the first side beam-receiving member and the second side beam-receiving member. The first side beam-receiving member and the second side beam-receiving member are disposed a given distance apart from the main beam-receiving member and located at positions such that no interference with the main beam reflected from an unfocused information signal storage layer of the multi-layer optical disc is caused.

The optical pick-up device used here is provided with a diffraction grating for dividing the light beam emitted from the light source into the three separate beams composed of the main beam and the first and second side beams. The diffraction grating divides the light beam emitted from the light source into the three separate beams which are spaced apart from each other by such a given distance that the main beam reflected from an unfocused information signal storage layer causes no interference with said first side beam-receiving member and said second side beam-receiving member. In addition, the optical pick-up device is provided with an optical element for generating an astigmatism.

In the optical pick-up device, a focusing error is detected based on a detection result from the main beam-receiving member.

Further, a tracking error is detected based on a detection results from the first side beam-receiving member and the second side-beam-receiving member.

In another aspect of the present invention, there is provided an optical pick-up device which includes a light source for emitting a light beam to be radiated toward the multi-layer optical disc having a plurality of information signal storage layers which are arranged in a overlapped manner and on each of which a desired information signal is recorded, an optical means including a diffraction grating for dividing the light beam emitted from the light source into three separate beams composed of a main beam and first and second side beams, and an objective lens for radiating the three separate beams divided by the diffraction grating onto the multi-layer optical disc in such a manner that the respective beams are focused on the information signal storage layer of the multi-layer optical disc, a main beam-receiving member for receiving the main beam reflected from the multi-layer optical disc, a first side beam-receiving member for receiving the first side beam reflected from the multi-layer optical disc, a second side beam-receiving member for receiving the second side beam reflected from the multi-layer optical disc and a means for outputting a detection signal indicative of a quantity of light in response to the light received by the main beam-receiving member, the first side beam-receiving member and the second side beam-receiving member. The first side beam-receiving member and the second side beam-receiving member are disposed a given distance apart from the main beam detector and located at such positions that no interference with the main beam reflected from an unfocused information signal storage layer of the multi-layer optical disc is caused.

In a further aspect of the present invention, there is provided an optical pick-up device which includes a light source for emitting a light beam to be radiated toward said multi-layer optical disc having a plurality of information signal storage layers which are arranged in a overlapped manner and on each of which a desired information signal is recorded, an optical means including a diffraction grating for dividing the light beam emitted from the light source into three separate beams composed of a main beam and first and second side beams, an objective lens for radiating the three separate beams divided by the diffraction grating onto the multi-layer optical disc in such a manner that the respective beams are focused on the information signal storage layer of the multi-layer optical disc, and a polarizing beam splitter on which the light beam reflected from the multi-layer optical disc is incident, first and second photo-detectors each having a main beam-receiving member for receiving the main beam reflected from the multi-layer optical disc and transmitted through or reflected on the polarizing beam splitter, a first side beam-receiving member for receiving the first side beam reflected from the multi-layer optical disc and transmitted through or reflected on the polarizing beam splitter, a second side beam-receiving member for receiving the second side beam reflected from the multi-layer optical disc and transmitted through or reflected on the polarizing beam splitter, and a means for outputting a detection signal indicative of a quantity of light in response to the light received by the main beam-receiving member, the first side beam-receiving member and the second side beam-receiving member provided on each of said first and second photo-detectors. The first side beam-receiving member and the second side beam-receiving member provided on each of said first and second photo-detectors are disposed a given distance apart from the main beam detector and located at such positions that no interference with the main beam reflected from an unfocused information signal storage layer of the multi-layer optical disc is caused.

Here, the main beam-receiving member provided in each of the first and second photo-detectors is divided into three strip-like light-receiving sub-members.

Other objects and advantages of the present invention will become more apparent by referring to the following detailed description of the preferred embodiment of the present invention when read in conjunction with the accompanying drawings.

PREFERRED EMBODIMENT OF THE INVENTION

In the foregoing, an optical pick-up device according to preferred embodiments of the present invention is described. The optical pick-up device is adapted to be incorporated in a recording and/or reproducing apparatus in which a multi-layer optical disc having two information signal storage layers is used as a recording medium.

With the optical pick-up device according to the present invention, the tracking control is performed by detecting a tracking error by using a 3-spot method and the focusing control is performed by detecting a focusing error by using an astigmatism method.

Figure 1:
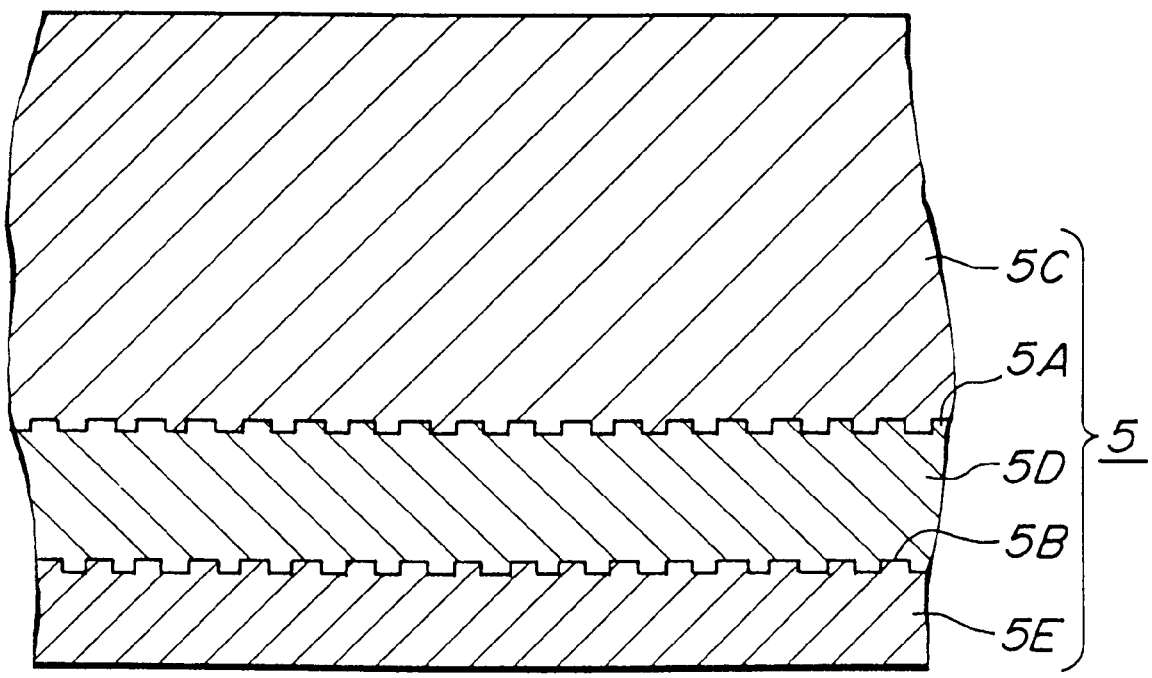
FIG. 1 is a cross-sectional view showing an optical disc having two information signal storage layers on which an information signal to be reproduced by an optical pick-up device according to the present invention is recorded.
Figure 2:
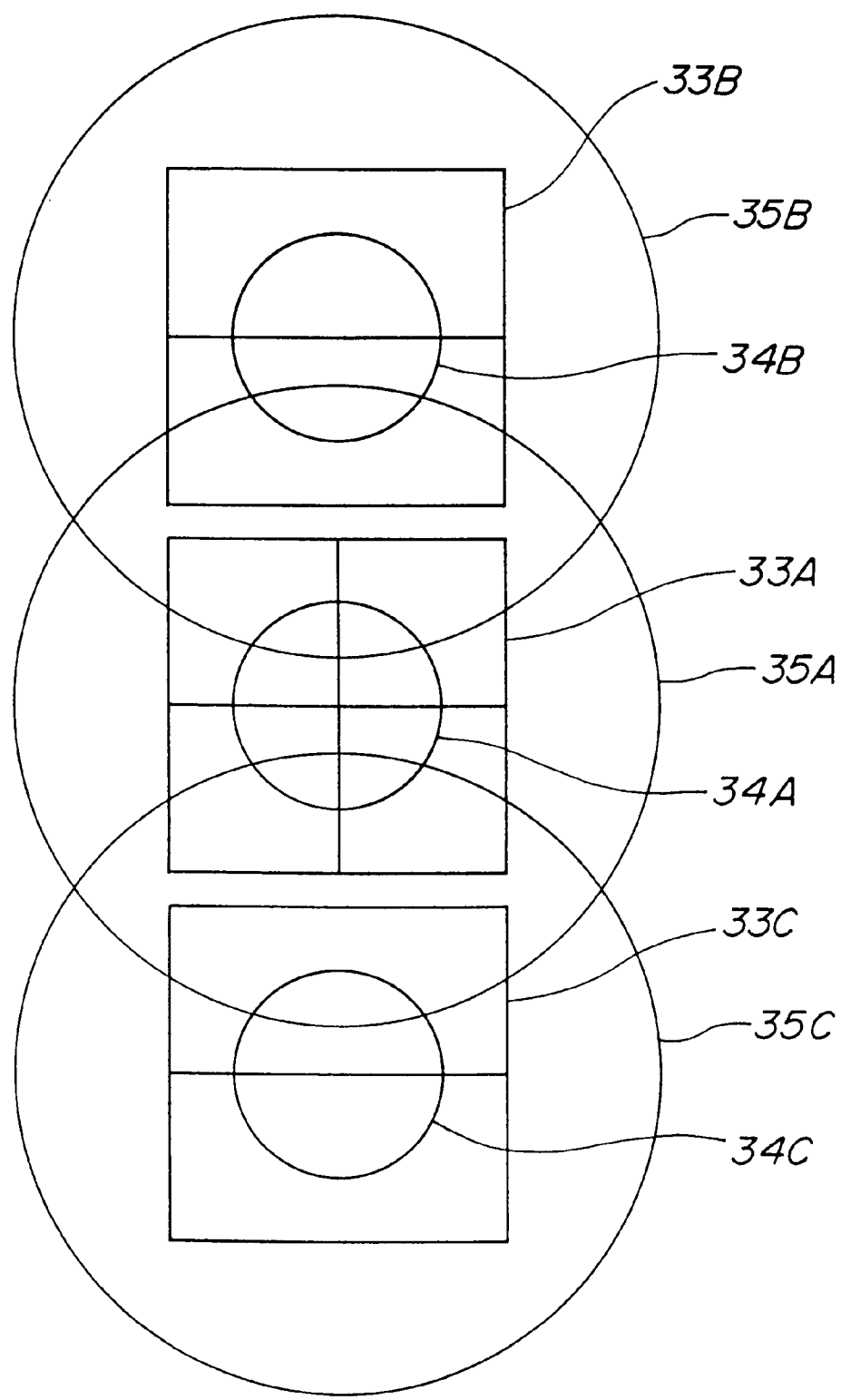
FIG. 2 is a plan view showing a photo-detector to explain problems posed on a conventional optical pick-up device.

In addition, the two-layer optical disc 5 used in the recording and/or reproducing apparatus to which the optical pick-up device according to the present invention is applied, includes, as shown in FIG. 1, a disc substrate 5C made of a transparent synthetic material such as polycarbonate (PC) or polymethyl-methacrylate (PMMC), a first information signal storage layer 5A formed over a primary surface of the disc substrate 5C, a spacer layer 5D made of a transparent resin material and formed over the first information signal storage layer 5A, a second information signal storage layer 5B formed over the first information signal storage layer 5A through the spacer layer 5D, and a protecting layer 5E formed over the second information signal storage layer 5B.

In such an optical disc, when the information signal stored on the second information signal storage layer 5B is read out by means of the optical pick-up device according to the present invention, a light beam emitted from a semiconductor laser is transmitted through the first information signal storage layer 5A and radiated onto the second information signal storage layer 5B.

Figure 3:
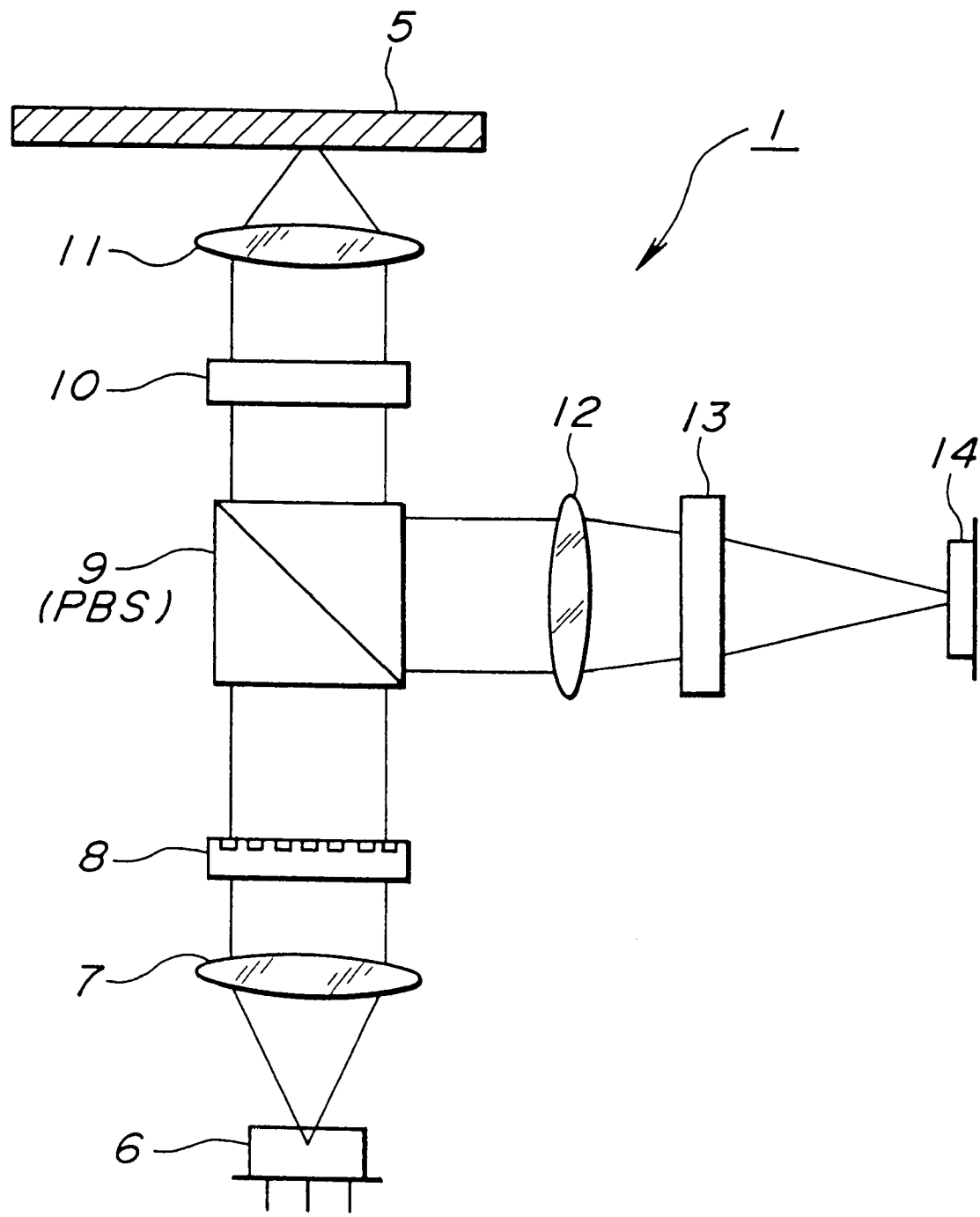
FIG. 3 is a side view schematically showing an optical pick-up device according to a first embodiment of the present invention.

The optical pick-up device 1 according to a first embodiment of the present invention includes, as shown in FIG. 3, a semiconductor laser 6 serving as a light source for emitting a light beam, a collimator lens 7 disposed between the semiconductor laser 6 and the two-layer optical disc 5 such that optical axes thereof are aligned with each other, a diffraction grating 8, a polarizing beam splitter (PBS) 9, ¼ wave-length plate 10 and an objective lens 11. Furthermore, the optical pick-up device 1 has a photo-detector 14 for receiving a light beam reflected from the optical disc 5, a focusing lens 12 provided between the photo-detector 14 and the polarizing beam splitter 9 such that optical axes thereof aligned with each other, and a cylindrical lens 13.

Figure 4:
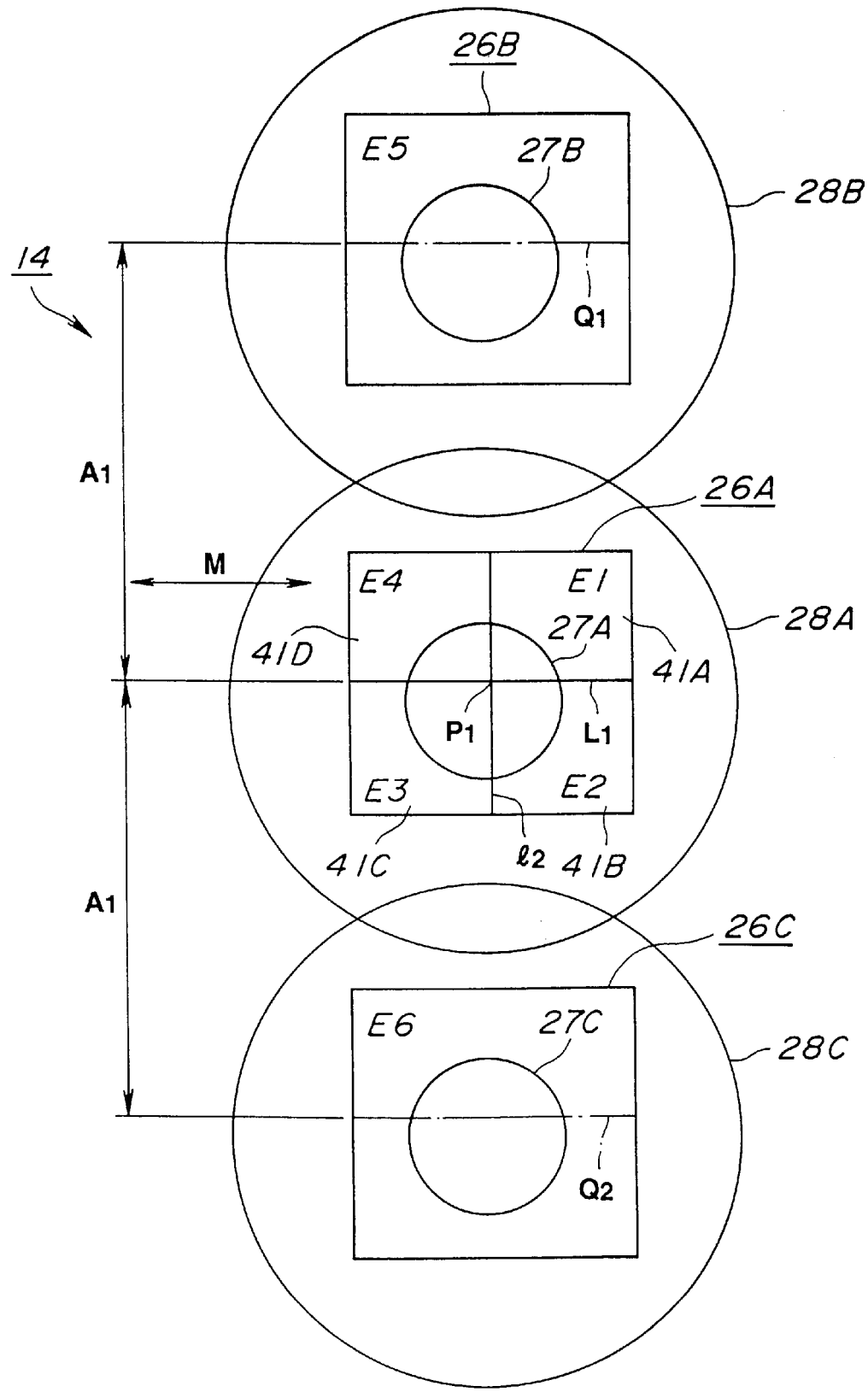
FIG. 4 is a plan view showing a photo-detector provided in the optical pick-up device according to the first embodiment of the present invention.

As shown in FIG. 4, the photo-detector 14 is composed of a main beam detector 26A for receiving a centrally-incident main beam of three separate light beams, and first and second side beam detectors 26B and 26C for receiving the side beams radiated on opposite sides of the main beam. Accordingly, the first and second side beam detectors 26B and 26C of the photo-detector are arranged on opposite sides of the main beam such that the main beam detector 26A is interposed therebetween.

The main beam detector 26A which is a constituent of the photo-detector 14 is composed of four segments, whereby a light receiving surface thereof is divided into first to fourth light receiving regions 41A to 41D along separate lines $L_1$ and $l_2$ as shown in FIG. 4, which are perpendicular to each other and crossed at a center (optical axis) of the main beam 27A of the reflected light incident on the light receiving surface, namely a central point $P_1$ of the light receiving surface, as shown in FIG. 4.

Figure 5A:
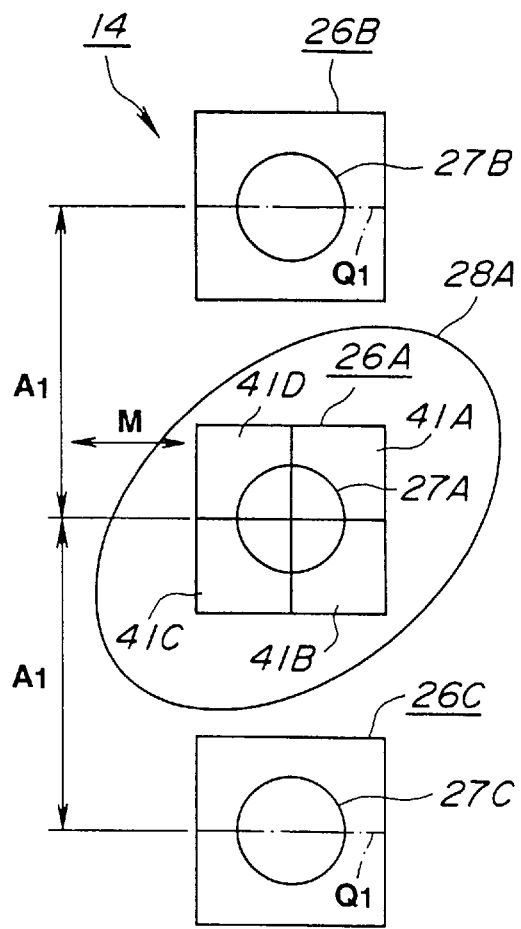
FIGS. 5A and 5B are plan views showing the condition of a stray light attributed to a main beam reflected from respective information signal storage layers and incident on a main beam detector of the photo-detector.
Figure 5B:
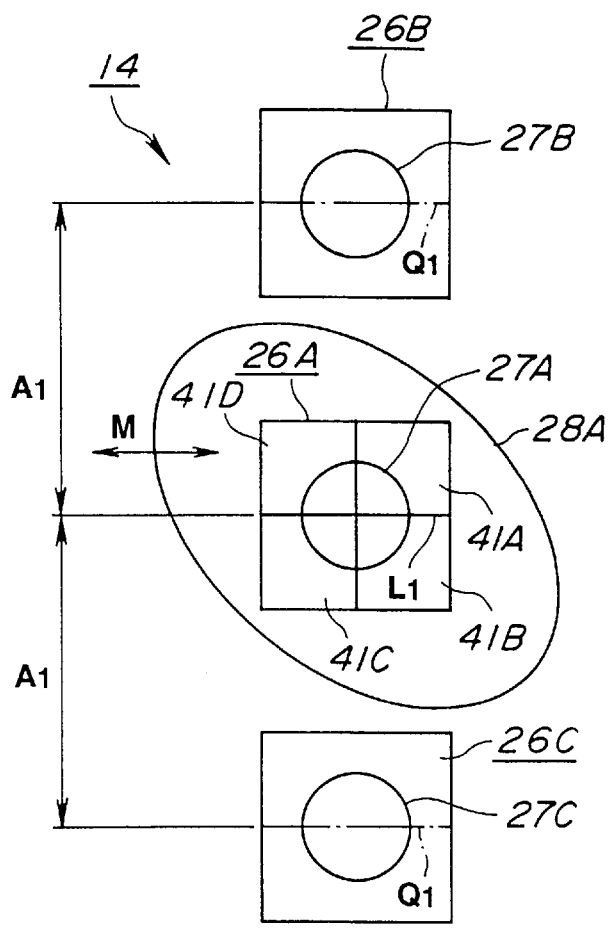

As shown in FIGS. 4, 5A and 5B, the first side beam detector 26B and the second side beam detector 26C are spaced apart from the main detector 26A by such a distance that the side beam detectors are not radiated with a stray light 28A attributed to the main beam of the reflected light coming from the information signal storage layer, on which the light beam radiated through the objective lens 11 is not focused and whose information signal is not intended to be read out. That is, the first and second side beam detectors 26B and 26C are so arranged such that reference center lines $Q_1$ and $Q_2$ thereof and the separate line $L_1$ of the main beam detector 26A, which extend perpendicularly to the direction of a row of the detectors 26A to 26C as shown in FIGS. 4, 5A and 5B, are spaced apart from each other by a distance $A_1$ which is sufficient to prevent the first and second side beam detectors from being radiated with the stray light 28A attributed to the main beam of the light reflected from the unfocused information signal storage layer whose information signal is not intended to be read out.

An optical path of the light beam emitted from the semiconductor laser 6 and the occurence of the stray light 28A of the main beam incident on the main beam detector 26A during read-out and reproduction of the information signal from the first information signal storage layer of the two-layer optical disc 1, are explained by using the aforementioned arrangement of the optical pick-up device 1.

First, the light beam emitted from the semiconductor laser 6 is incident on the collimator lens 7. The collimator lens 7 permits the incident light beam to pass through converting it from a divergent light to a parallel one. The light beam passing through the collimator lens 7 is then incident on the diffraction grating 8.

The diffraction grating 8 divides the incident light beam into three separate light beams including the main beam 27A, the first side beam 27B and the second side beam 27C, which in turn are incident on the polarizing beam splitter 9. Thus, the polarizing beam splitter 9 permits the respective light beams split from the light beam emitted from the semiconductor laser 6 to pass toward the two-layer optical disc 5. The polarizing beam splitter 9 reflects the light reflected from the two-layer optical disc 5, as described hereinafter.

The respective light beams passing through the polarizing beam splitter 9 are incident on the ¼ wave-length plate 10. When passing through the ¼ wave-length plate 10, each light beam is converted from a linearly polarized light beam to a circularly polarized light beam. The light beams passing through the ¼ wave-length plate 10 are incident on the objective lens 11.

The objective lens 11 condenses the incident light beams and radiates them onto the first information signal storage layer 5A of the two-layer optical disc 5. At this time, the respective light beams radiated on the first information signal storage layer 5A of the two-layer optical disc 5 are not only focused on the first information signal storage layer 5A of the two-layer optical disc 5 but also passed therethrough and radiated onto the information signal storage layer 5B.

The light beams radiated onto the first information signal storage layer 5A of the two-layer optical disc 5 are reflected on the first information signal storage layer 5A and also reflected by the second information signal storage layer 5B. That is, the light beams radiated onto the first information signal storage layer 5A of the two-layer optical disc 5 are reflected not only by the first information signal storage layer 5A on which the incident light passing through the objective lens 11 is focused, but also on the second information signal storage layer 5B on which the incident light passing through the objective lens 11 is not focused. Each of the light beams reflected from the second information signal storage layer 5B constitute a stray light for each of the light beams reflected from the first information signal storage layer 5A.

The reflected light beams and the stray light beams are incident on the objective lens 11 and pass therethrough so as to be incident on the ¼ wave-length plate 10. The ¼ wave-length plate 10 converts each of the incident reflected light beams and stray light beams form a linearly polarized light to a circularly polarized light. The reflected light beams and the stray light beams pass through the ¼ wave-length plate 10 and are incident on the polarizing beam splitter 9. The polarizing beam splitter 9 reflects the reflected light beams and the stray light beams . The light beams and the stray light beams reflected by the polarizing beams splitter 9 are then incident on the focusing lens 12 and condensed when passed therethrough.

The reflected light beams and the stray light beams passing through the focusing lens 12 are incident on the cylindrical lens 13. The reflected light beams and the stray light beams incident on the cylindrical lens 13 are further condensed and then radiated onto the respective detectors of the photo-detector 14. At this time, there occurs an astigmatism between the reflected light beams and the stray light beams passing through the cylindrical lens 13.

The main beam detector 26A of the photo-detector 14 generates a focusing control at the objective lens 11 by determining a quantity of the light received by the first to fourth light receiving regions 41A to 41D thereof. A focusing error signal FE, which is indicative of a defocusing degree of the light radiated onto a surface of the first information signal storage layer 5A of the two-layer optical disc 5, can be calculated from the following equation:

$$FE=(E1+E3)-(E2+E4)$$

where E1, E2, E3 and E4 represent detection outputs generated from the light-receiving regions 41A, 41B, 41C and 41D of the main beam detector 26A, respectively, in response to the amounts of the light beams received thereby.

The focusing control of the objective lens 11 can be performed based on the thus-obtained focusing error signal FE.

On the other hand, the first and second side beams 27B and 27C are incident on the first and second side beam detectors 26B and 26C of the photo-detector 14, respectively. A tracking error signal TE, which is indicative of dislocation of the main beam relative to recording tracks formed on the first information signal storage layer 5A of the two-layer optical disc 5, can be calculated from the following equation:

$$TE=E5E6$$

where E5 and E6 represent detection outputs generated from the first and second side beam detectors 26B and 26C in response to the quantities of the light beams-received thereby.

The tracking control of the objective lens 11 can be performed based on the thus-obtained tracking error signal TE.

Meanwhile, the main beam 27A of the light reflected from the first information signal storage layer 5A is incident on the main beam detector 26A, as shown in FIGS. 5A and 5B, while the first and second side beams 27B and 27C of the light reflected from the first information signal storage layer 5A are incident on the side beam detectors 26B and 26C, respectively. Furthermore, the stray light beam 28A attributed to the main beam of the light reflected from the second information signal storage layer 5B is incident on the main beam detector 26A, while stray light beams 28B and 28C attributed to the first and second side beams, respectively, reflected from the second information signal storage layer 5B, are incident on the first and second side beam detectors 26B and 26C, respectively, as shown in FIGS. 5A and 5B.

As described above, the first and second side beam detectors 26A and 26B are spaced apart from the main beam detector 26A by a given distance sufficient to avoid influence of the stray light beam 28A attributed to the main beam, so that the stray light beam 28A incident on the main beam detector 26A is prevented from being radiated over the first and second side beam detectors 26B and 26C as shown in FIGS. 5A and 5B. Also, the stray light beams 28B and 28C attributed to the first and second side beams cannot be radiated over the main beam detector 26A though not shown in the figures.

In addition, even if the stray light beams 28B and 28C attributed to the first and second side beams from the second information signal storage layer 5B is radiated over the main beam detector 26A, no significant influence is caused on the main beam detector 26A because these stray light beams have a considerably lower light intensity as compared to that of the stray light beam 28A attributed to the main beam.

In the optical pick-up device 1 according to the present invention, the stray light beam 28A attributed to the main beam forms an elliptic spot, as shown in FIGS. 5A and 5B, due to an astigmatism caused by the cylindrical lens 13. Further, major and minor axes of the elliptic spot of the stray light beam 28A attributed to the main beam appear in a reverse relation depending upon whether it reflects from the first information signal storage layer 5A or from the second information signal storage layer 5B.

That is, in the optical pick-up device according to the present invention, in the event that the information signal to be read out and reproduced is stored on the second information signal storage layer 5B of the two-layer optical disc 5, which is located further from the objective lens 11, the stray light beam 28A attributed to the main beam in the light reflected from the first information signal storage layer 5A forms an elliptic spot having a major axis inclined at an angle of 45 degrees rightwardly as shown in FIG. 5A.

Conversely, in the event that the information signal to be read out and reproduced is stored on the first information signal storage layer 5A of the two-layer optical disc 5, which is located closer to the objective lens 11, the stray light beam 28A attributed to the main beam in the light reflected from the second information signal storage layer 5B forms an elliptic spot having a major axis inclined at an angle of 40 degrees leftwardly as shown in FIG. 5B.

Figure 6:
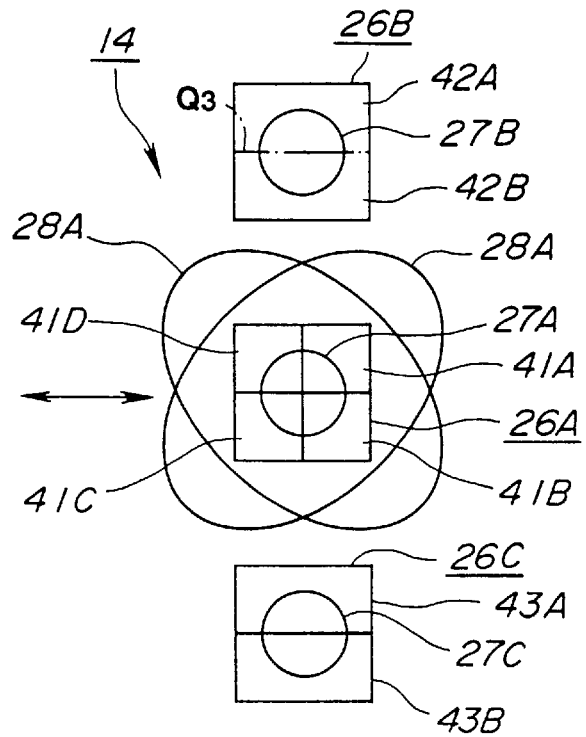
FIG. 6 is a plan view showing the condition of a light beam and a stray light incident on a main beam detector and side beam detectors of the photo detector.

In the optical pick-up device according to the present invention, when the two-layer optical disc 5 is caused to incline in a radial direction or when the objective lens 11 undergoes a change in visual field, the stray light 28A attributed to the main beam or distribution of light intensity thereof is shifted on the main beam detector 26A in the direction of an arrow M as indicated in FIGS. 5A, 5B and 6. However, the stray light 28A attributed to the main beam and shifted on the main beam detector 26A is not radiated over the first and second side beam detectors 26B and 26C, so that no D.C. offset of the tracking error signal occurs.

As described above, in the optical pick-up device according to this embodiment of the present invention, the first and second side beam detectors 26B and 26C are disposed outside of a spot diameter of the stray light 28A, whereby the first and second side beam detectors 26B and 26C are exposed to no overlapped radiation of the stray light 28A attributed to the main beam. Accordingly, in the optical pick-up device according to the present invention, since the D.C. offset of the tracking error signal is effectively prevented, accurate tracking control of the light beam radiated over the two-layer optical disc 5 can be carried out.

Further, in the optical pick-up device according to the present invention, even if the focal point of the light beam radiated onto the two-layer optical disc is switched from one information signal storage layer to another layer due to a change in information signal to be read out and reproduced, no D.C. offset of the tracking error signal occurs. Consequently, the tracking control of the light beam radiated over the two-layer optical disc 5 can be accurately carried out even in such a case.

Furthermore, in the optical pick-up device according to the present invention, the focusing control is performed by using an astigmatism method, which enables not only miniaturization of the apparatus as a whole but also improvement in sensitivity for detection of the focusing error signal.

In the afore-mentioned arrangement of the optical pick-up device according to this embodiment of the present invention, the polarizing beam splitter 9 is employed. However, the polarizing beam splitter 9 is replaced with a normal beam splitter, whereby the ¼ wave-length plate 10 can be omitted. That is, by using the normal beam splitter in place of the polarizing beam splitter 9, it is not necessary to use the ¼ wave-length plate 10. This permits not only a simplified construction of the apparatus as a whole, but also reduction in manufacturing cost thereof.

In the afore-mentioned optical pick-up device according to the first embodiment of the present invention, the light beam emitted from the semiconductor laser 6 is introduced to the diffraction grating 8 so as to be divided into the main beam 27A and the first and second side beams 27B and 27C, which are spaced by a given distance apart from each other. The main beam detector 26A and the first and second side beam detectors 26B and 26C are so arranged as to be spaced by a constant distance Al from each other, as shown in FIG. 4. However, in order to prevent the first and second side beam detectors from being adversely affected by the stray light attributed to the main beam, there can be also provided an optical pick-up device 2 according to a second embodiment of the present invention, as explained below.

The optical pick-up device according to the second embodiment of the present invention has essential parts common to those of the optical pick-up device 1 according to the first embodiment of the present invention. Therefore, like parts are identified by like reference numerals and detailed explanation thereof are omitted here.

Figure 7:
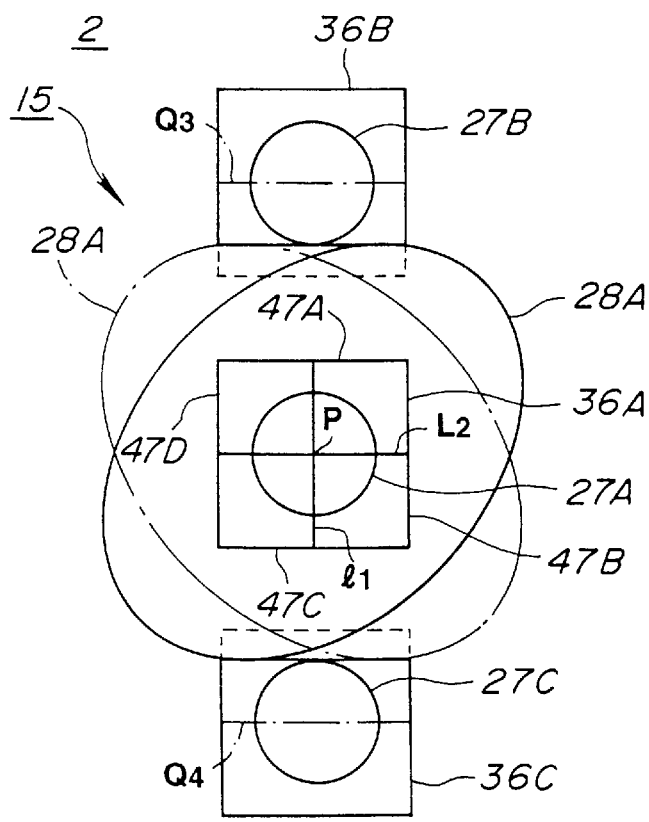
FIG. 7 is a plan view showing a photo-detector provided in an optical pick-up device according to a second embodiment of the present invention.

In the optical pick-up device according to the second embodiment of the present invention, as shown in FIG. 7, a photo-detector 15 is composed of a main beam detector 36A and first and second side beam detectors 36A and 36B disposed on opposite sides of the main beam detector 36A such that the main beam detector 36A is interposed therebetween.

The main beam detector 36A of the photo-detector 15 is of four-segment construction and has first to fourth light-receiving regions 47A to 47D divided along separate lines $L_2$ and $l_1$ which extend perpendicularly to each other and are crossed at a center (optical axis) of the main beam 27A of the light reflected from the two-layer optical disc 5 and radiated onto a light-receiving surface thereof, namely a central point P.

The first side beam detector 36B is partially cut out as indicated by a broken line in FIG. 7 on a side where the stray light 28A is radiated in an overlapped relation to the side beams, namely a side facing the main beam detector 36A. The stray light 28A in the form of a beam spot is attributed to the main beam of the light beams reflected from the unfocused information signal storage layer whose information signals are not intended to be read out, and incident on the main beam detector 36A. The second side beam detector 36C is also partially cut out as indicated by a broken line in FIG. 7, on a side where the stray light 28A incident on the main beam detector 36A is radiated in an overlapped relation to the side beams, namely a side facing the main beam detector 36A.

That is, both the first and second side beam detectors 36B and 36C are partially cut out at portions located on inner sides thereof relative to reference center lines $Q_3$ and $Q_4$ extending perpendicularly to the direction of the row of the respective detectors 36A to 36C, as shown in FIG. 7.

The optical pick-up device 2 having the afore-mentioned arrangement can be also prevented from being adversely affected by the stray light 28A attributed to the main beam of the light reflected from the information signal storage layer on which the light beams are not focused and whose information signals are not intended to be read out.

Next, an optical pick-up device 3 according to a third embodiment of the present invention is explained below. In the optical pick-up device, a tracking control is carried out by using the 3-spot method while a focusing control is carried out by using a differential concentric circles method.

Figure 8:
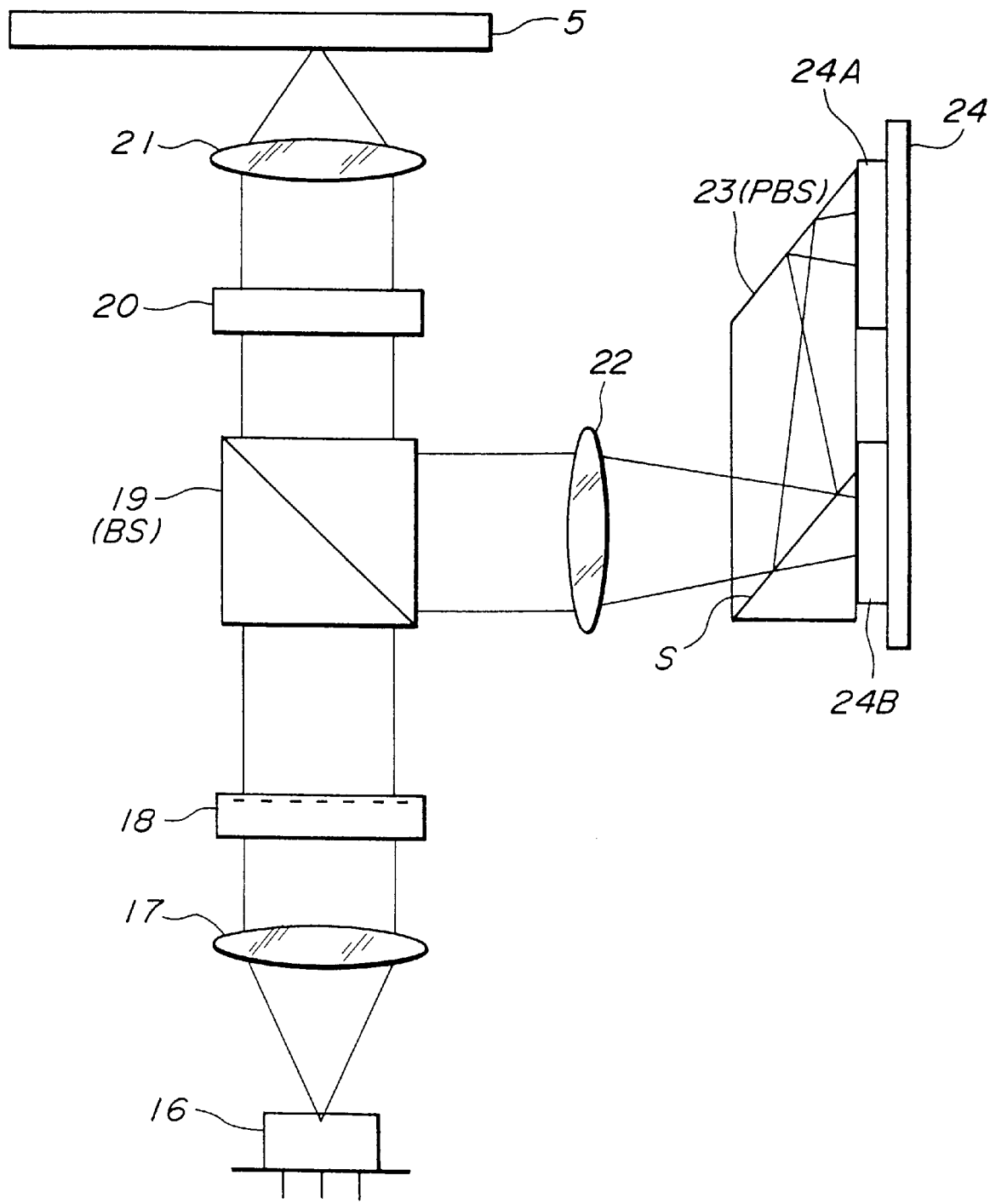
FIG. 8 is a side view schematically showing an optical pick-up device according to a third embodiment of the present invention.

As shown in FIG. 8, similarly to those of the preceding embodiments, the optical pick-up device according to this embodiment also includes a semiconductor laser 16 serving as a light source for emitting a light beam, a collimator lens 17 disposed between the semiconductor laser 16 and the two-layer optical disc 5 such that optical axes thereof are aligned with each other, a diffraction grating 18, a beam splitter (BS) 19, a ¼ wave-length plate 20 and an objective lens 21. Further, the optical pick-up device 3 is provided with a photo-detector 24 for receiving a light beam reflected from the two-layer optical disc 5, a focusing lens 22 disposed between the photo-detector 24 and the beam splitter (BS) 19 such that optical axes thereof are aligned with each other, and a polarizing beam splitter (PBS) 23.

Figure 9:
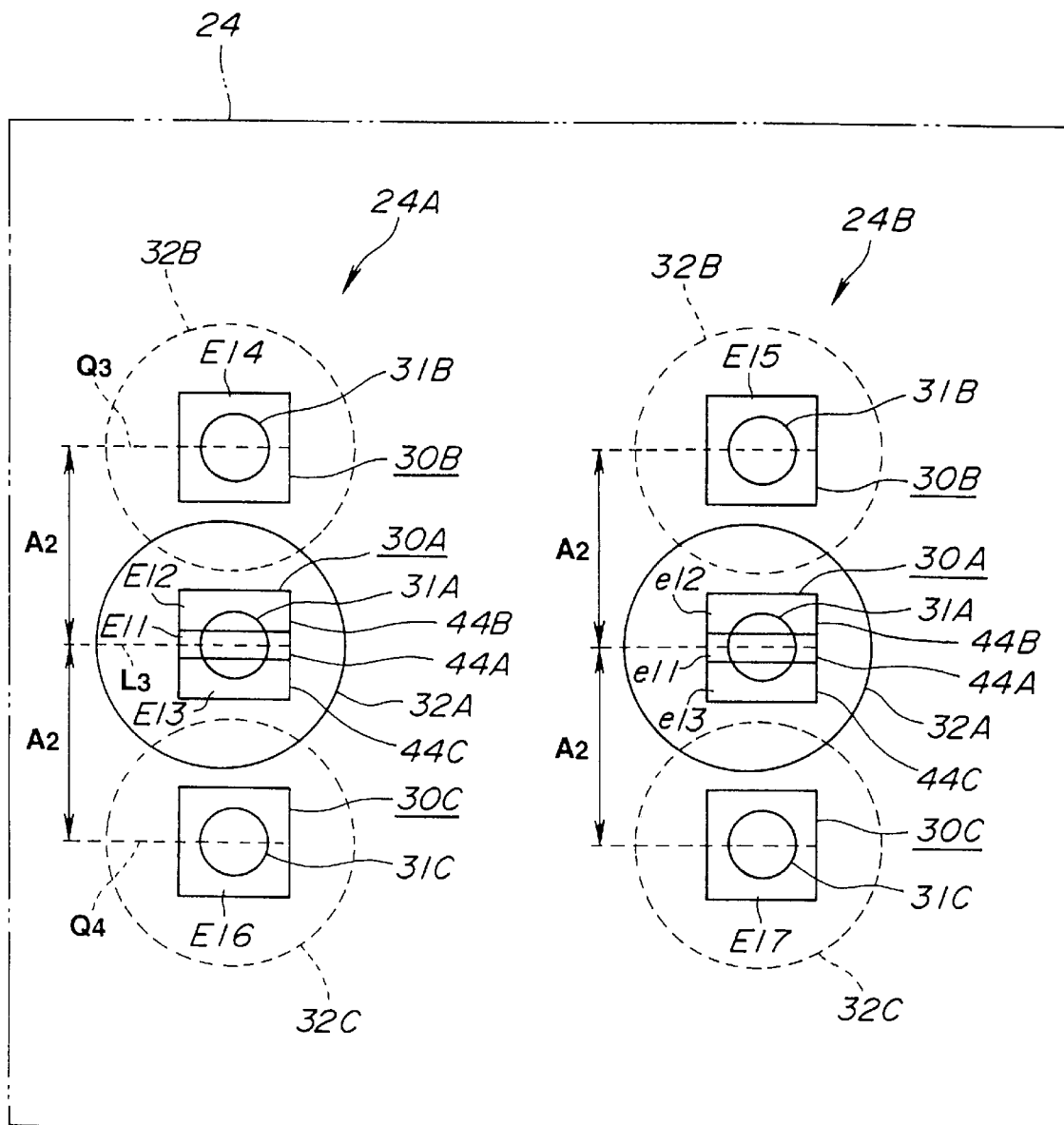
FIG. 9 is a plan view showing a photo-detector provided in the optical pick-up device according to the third embodiment of the present invention.

The photo-detector 24 is composed of a first photo-detector 24A and a second photo-detector 24B, as shown in FIG. 8. As shown in FIG. 9, each of the first and second photo-detectors 24A and 24B has a main beam detector 30A and first and second side beam detectors 30B and 30C disposed on opposite sides of the main beam detector 30A so as to interpose the main beam detector 30A therebetween.

The main beam detector 30A is composed of three separate strip-like plates which are disposed in parallel with each other and define first, second and third light-receiving regions 44A, 44B and 44C, respectively. The first and second side beam detectors 30B and 30C are in the form of a single plate and therefore have one light-receiving region only. The first and second side beam detectors 30B and 30C are disposed outside of a spot diameter of a stray light 32A attributed to the main beam reflected from the information signal layer on which the light beam are not focused and whose information signals are not intended to be read out, and incident on the main beam detector 30A.

That is, as shown in FIG. 9, the first and second side beam detectors 30B and 30C are spaced a given distance apart from the main beam detector 30A by a distance $A_2$ so as not to receive the stray light 32A attributed to the main beam reflected from the information signal storage layer from which no information signal is intended to be read out, is formed between each of the reference center lines $Q_3$ and $Q_4$ Of the first and second side beam detectors and the center line $L_3$ Of the main beam detector 30A.

Figure 10:
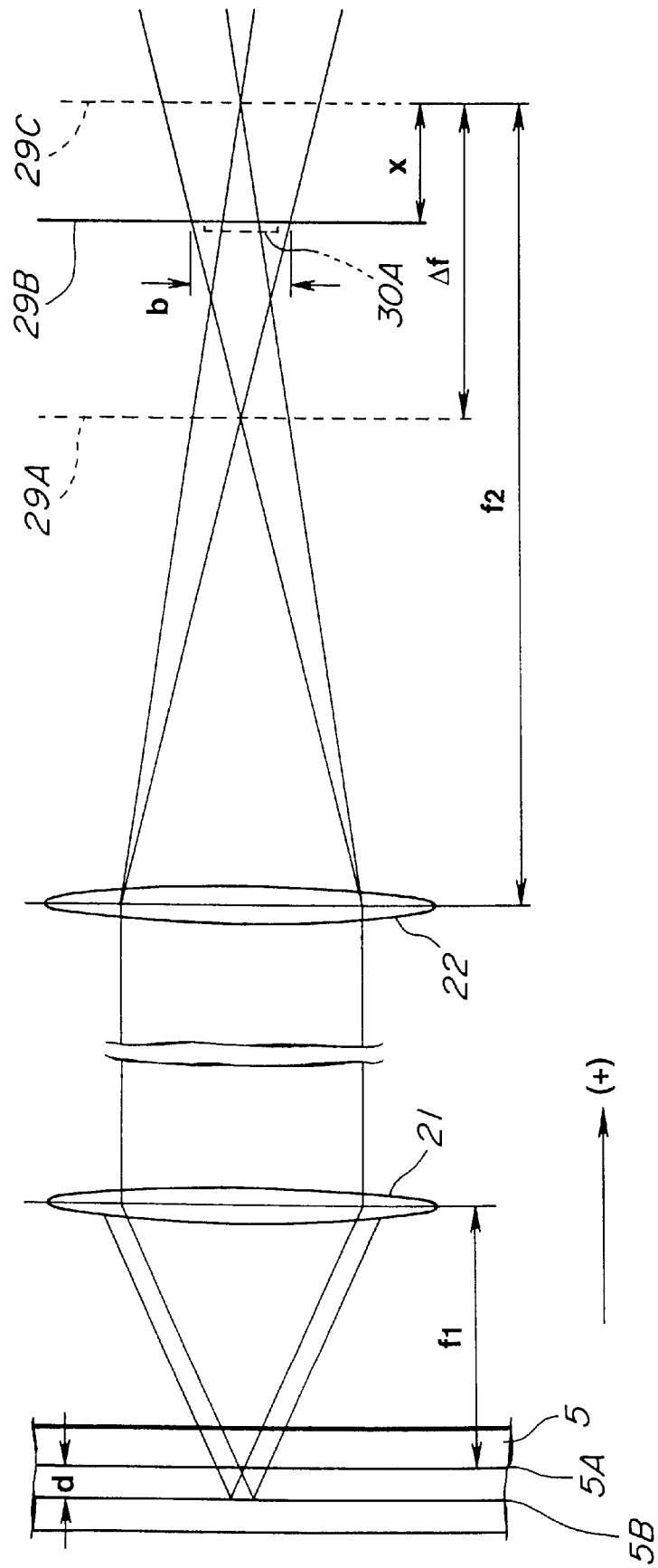
FIG. 10 is a schematic view serving for explaining equations for calculating a spot diameter of a stray light attributed to a main beam and radiated onto a main beam detector provided in an optical pick-up device for an optical disc.

A spot diameter b of the stray light 32A attributed to the main beam, which is reflected from the information signal storage layer from which no information signal is intended to be read out and radiated onto the main beam detector 30A, is calculated from the following equation (1), in the event that the afore-mentioned astigmatism method is not used for conducting a focusing control as shown in FIG. 10. In the equation (1):

d: distance between two information signal storage layers of the two-layer optical disc 5 (a thickness of the spacer layer 5D);

$f_1$: focal length of the objective lens 21;

$f_2$: focal length of the focusing lens 22;

Δf: distance between a focal point 29A of the stray light 32A attributed to the main beam and a focal plane 29C of the focusing lens 22;

x: distance between a light-receiving surface 29B of the main beam detector 30A and the focal plane 29C of the focusing lens 22;

b: spot diameter of the stray light 32A attributed to the main beam and radiated on the light-receiving surface 29B of the main beam detector 30A; and NA: numerical aperture of the objective lens 21.

Here, the value d is obtained by using the focal plane as a reference plane while the values Δf and x are determined by using the focal plane 29C of the focusing lens 22 as a reference plane. Incidentally, a dimension taken in the proceeding direction of the reflected light is represented in a positive (+) value.

That is, the spot diameter b of the stray light 32A is given by the following equation (1):

$$b = \left| \frac{X - \Delta f}{f_2 + \Delta f} * 2f_1 * NA \right| = 2 \left| \frac{x - 2\eta_2 d}{f_2 + 2\eta_2 d} * f_1 * NA \right| \quad (1)$$

where h represents a lateral magnification of the reflected light detection system and satisfies the relationships of $\Delta f = 2n^2 d$ and $\eta = f_2/f_1$. Therefore, a spot radius b/2 of the stray light is expressed by the following equation (2):

$$\frac{b}{2} = \left| \frac{x - 2\eta^2 d}{f_2 + 2\eta^2 d} * f_1 * NA \right| \quad (2)$$

Further, if an actual value of d is d' and a refractive index of the disc substrate is n, the following relationship is established:

$$d' = |nd| (d' > 0)$$

Accordingly, when the information signal stored on the first information signal storage layer 5A of the two-layer optical disc 5 is intended to be read out and reproduced, a minimum value of the distance $A_2$ between each of the reference center lines $Q_3$ and $Q_4$ Of the first and second side beam detectors 30B and 30C and the center line $L_3$ Of the main beam detector 30A is given by the following equation (3):

$$\left| \frac{x - 2\eta^2 d // n}{f_2 + 2\eta^2 d // n} * f_1 * NA \right| \quad (3)$$

On the other hand, if the information signal stored on the second information signal storage layer of the two-layer optical disc 5 is intended to be read out and reproduced, the minimum value is given by the following equation (4):

$$\left| \frac{x + 2\eta^2 d // n}{f_2 - 2\eta^2 d // n} * f_1 * NA \right| \quad (4)$$

The minimum value of the distance $A_2$ between each of the reference centerlines $Q_3$ and $Q_4$ Of the first and second side beam detectors 30B and 30C and the center line $L_3$ of the main beam detector 30A is determined as a larger one of the values obtained from the equations (3) and (4).

In the afore-mentioned arrangement of the optical pick-up device 3 according to the third embodiment of the present invention, an optical path of the light beam emitted from the semiconductor laser 16 and the occurrence of the stray light 32A of the main beam radiated on the main beam detector 30A will be explained with reference to FIGS. 8 and 9 for the case in which the information signal stored on the first information signal storage layer 5A of the two-layer optical disc 5 is intended to be read out.

The light beam emitted from the semiconductor laser 16 is first incident on the collimator lens 17. The collimator lens 17 transmits the incident laser beam and converts it from a divergent light to a parallel light. The light beam passes through the collimator lens 17 and is then incident on the diffraction grating 18. When transmitted through the diffraction grating 18, the light beam is divided into three separate beams composed of a main beam 31A and two side beams 31B and 31C. The three separate beams are incident on the beam splitter 19. The respective beams are allowed to pass through the beam splitter 19. The light beams passing through the beam splitter 19 are then incident on the objective lens 21. The objective lens 21 condenses the incident light beams and radiates the condensed light beams onto the first information signal storage layer 5A of the two-layer optical disc 5. At this time, the respective light beams directed to the first information signal storage layer 5A of the two-layer optical disc 5 are is radiated not only onto the first information signal storage layer 5A but also transmitted through the first information signal storage layer 5A and also radiated onto the second information signal storage layer 5B.

The light beams radiated onto the first information signal storage layer 5A are reflected therefrom and the light beams radiated onto the second information signal storage layer 5B are also reflected therefrom. That is, the reflected light attributed to the light focused by the objective lens 21 on the first information signal storage layer 5A are mixed with the stray light beams reflected from the second information signal storage layer 5B on which the focusing of the objective lens 21 is not performed.

Thus, the mixed light beams reflected from the first information signal storage layer 5A and the second information signal storage layer 5B are incident on the objective lens 21. The objective lens 21 transmits the incident light beams reflected from the first information signal storage layer 5A and the second information signal storage layer 5B. The light beams are directed to the beam splitter 19 so as to be incident thereon.

When transmitted through the beam splitter, the respective incident light beams reflected from the first information signal storage layer 5A and the second information signal storage layer 5B are reflected thereon and directed towards the focusing lens 22 so as to be incident thereon. The incident light beams are converged by the focusing lens 22 when transmitted therethrough.

The light beams reflected from the first information signal storage layer 5A and the second information signal storage layer 5B are incident on the polarizing beam splitter 23. The polarizing beam splitter 23 divides each of the light beams reflected from the first information signal storage layer 5A and the second information signal storage layer 5B into two separate beams by reflecting a part of each light beam on a separating surface S thereof and transmitting the remainder of the light beam therethrough. The divided beams are respectively radiated onto the first photo-detector 24A and the second photo-detector 24B of the photo-detector 24.

The main beam detector 30A provided on each of the first photo-detector 24A and the second photo-detector 24B produces a focusing error signal in response to a detection output indicative of a light quantity of the main beam 31A incident on first to third light-receiving regions 44A to 44C thereof. The focusing control for the objective lens 21 is performed based on the thus-obtained focusing error signal.

In the foregoing, the condition for obtaining the focusing error signal in the optical pick-up device 3 according to the present embodiment is specifically explained below.

In the optical pick-up device 3, the focusing error signal can be obtained based on the detection outputs generated from the main beam detector 30A of the first photo-detector 24A and the main beam detector 30B of the second photo-detector 24B.

In a case where the detection outputs based on light quantities of the light beams received by the first, second and third light-receiving regions 44A, 44B and 44C of the main beam detector 30A of the first photo-detector 24A are indicated by E11, E12 and E13, respectively, a first focusing error signal EF1 can be obtained from the detection output of the main beam detector 30A according to the following equation (5):

$$EF1 = E11 - (E12 + E13) \quad (5)$$

Next, in a case where the detection outputs based on light quantities of the light beams received by the first, second and third light-receiving regions 44A, 44B and 44C of the main beam detector 30B of the second photo-detector 24B are indicated by e11, e12 and e13, respectively, a second focusing error signal EF2 can be obtained from the detection output of the main beam detector 30B according to the following equation (6):

$$EF2 = e11 - (e12 + e13) \quad (6)$$

Further, a focusing error signal EF of the optical pick-up device 3 can be obtained by subtracting the second focusing error signal EF2 from the first focusing error signal EF1 according to the following equation (7):

$$EF = EF1 - EF2 \quad (7)$$

On the other hand, a tracking error signal of the optical pick-up device 3 can be obtained from the detection outputs of the first side beam detector 30B and the second side beam detector 30C provided on each of the first and second photo-detectors 24A and 24B.

Here, in a case where detection outputs generated by the first side beam detectors 30B of the respective first and second photo-detectors 24A and 24B are indicated by E14 and E15, and detection outputs generated by the second side beam detectors 31C of the respective first and second photo-detectors 24A and 24B are indicated by E16 and E17, a tracking error signal TE indicating a degree of offset of a scanning light beam from the aimed recording track on the first information signal storage layer 5A of the two-layer optical disc 5 from which the information signal is intended to be read out, can be obtained according to the following equation (8):

$$TE=(E14+E15)-(E16+E17) \qquad (8)$$

The main beam 31A, the first side beam 31B and the second side beam 31C all reflected from the first information signal storage layer 5A or the second information signal storage layer 5B on which the light beam is focused to read out the information signal stored thereon, are incident on the main beam detector 30A, the first side beam detector 30B and the second beam detector 30C, respectively. In addition to these focused light beams, the main beam detector 30A, the first side beam detector 30B and the second beam detector 30C also receive respectively the stray light 32A attributed to the main beam, and the stray lights 32B and 32C attributed to the first and second side beams. These stray beams are all reflected from the second information signal storage layer 5B or the first information signal storage layer 5A on which the light beam is not focused and from which no information signal is intended to be read out.

In this case, the stray beam 32A attributed to the main beam which is reflected from the information signal storage layer 5A or 5B from which no information signal is intended to be read out, and radiated onto the main beam detector 30A, is not radiated over the first and second side beam detectors 30B and 30C in an overlapped relation to the side beams. Similarly, the stray lights 32B and 32C attributed to the first and second side beams, are not radiated over the main beam detector 30A in an overlapped relation to the main beam.

Even if the stray lights 32B and 32C attributed to the first and second side beams are radiated over the main beam detector 30A, in an overlapped relation to the main beam, the main beam detector 30A is not adversely affected by the radiation of side beams because a light intensity of each side beam is small enough as compared with that of the stray light 32A attributed to the main beam.

As described above, in the optical pick-up device 3 according to the third embodiment of the present invention, the first side beam detector 30B and the second side beam detector 30C are disposed outside of the spot diameter of the stray light 32A attributed to the main beam, so that the stray light 32A attributed to the main beam is not radiated over the first and second side detectors 30B and 30C in an overlapped relation to the side beams. Accordingly, in the optical pick-up device 3 according to the present embodiment, D.C. offset of the tracking error signal is also prevented from occurring, whereby the tracking control for the objective lens 11 can be accurately carried out. Thus, the recording track is accurately tracked by the light beam being radiated.

Further, the optical pick-up device 3 according the present embodiment is preventing from suffering from D.C. offset of the tracking error signal irrespective of whether an information signal to be reproduced is stored on the first information signal storage layer 5A or the second information signal storage layer 5B. Accordingly, the tracking control for the objective lens 11 can be accurately carried out. Similarly, the recording track is accurately tracked by the light beam being radiated.

Furthermore, the optical pick-up device 3 according to the present invention is provided with the polarizing beam splitter 23, because a differential concentric circles method is employed as a system for detection of the focusing error. Accordingly, in the optical pick-up device 3 according to the present embodiment, in case that the multi-layer optical disc used is of a magneto-optical type, the polarizing beam splitter 23 also functions as an apparatus for analyzing the information signal of the multi-layer magneto-optical disc. Thus, the polarizing beam splitter 23 serves for detecting both the focusing error signal and the information signal of the multi-layer magneto-optical disc. Accordingly, simplification in an entire structure of the apparatus is accomplished, so that reduction in size of an entire body of the apparatus can be realized.

In the optical pick-up device 3 according to the third embodiment of the present invention, the light beam emitted from the semiconductor laser 6 is directed to the diffraction grating 18 where the light beam is divided three separate beams including the main beam 31A, the first side beam 31B and the second side beam 31C. The main beam 31A, the first side beam 31B and the second side beam 31C are radiated to the main beam detector 30A, the first side beam detector 30B and the second side beam detector 30C, respectively. The main beam detector 30A, the first side beam detector 30B and the second side beam detector 30C are disposed spaced apart from each other by the constant distance $A_2$ corresponding to that between the main beam 31A, the first side beam 31B and the second side beam 31C. In the foregoing, there is described an optical pick-up device 4 according to a fourth embodiment of the present invention, which has such a simplified construction that the stray light attributed to the main beam and radiated over the first and second side beam detectors does not adversely affect the function thereof.

Incidentally, some elements or members of the optical pick-up device 4 according to the fourth embodiment of the present invention are identical to those of the optical pick-up device 3 according to the third embodiment. Therefore, like reference numerals denote like parts and the detailed explanations thereof are omitted.

Figure 11:
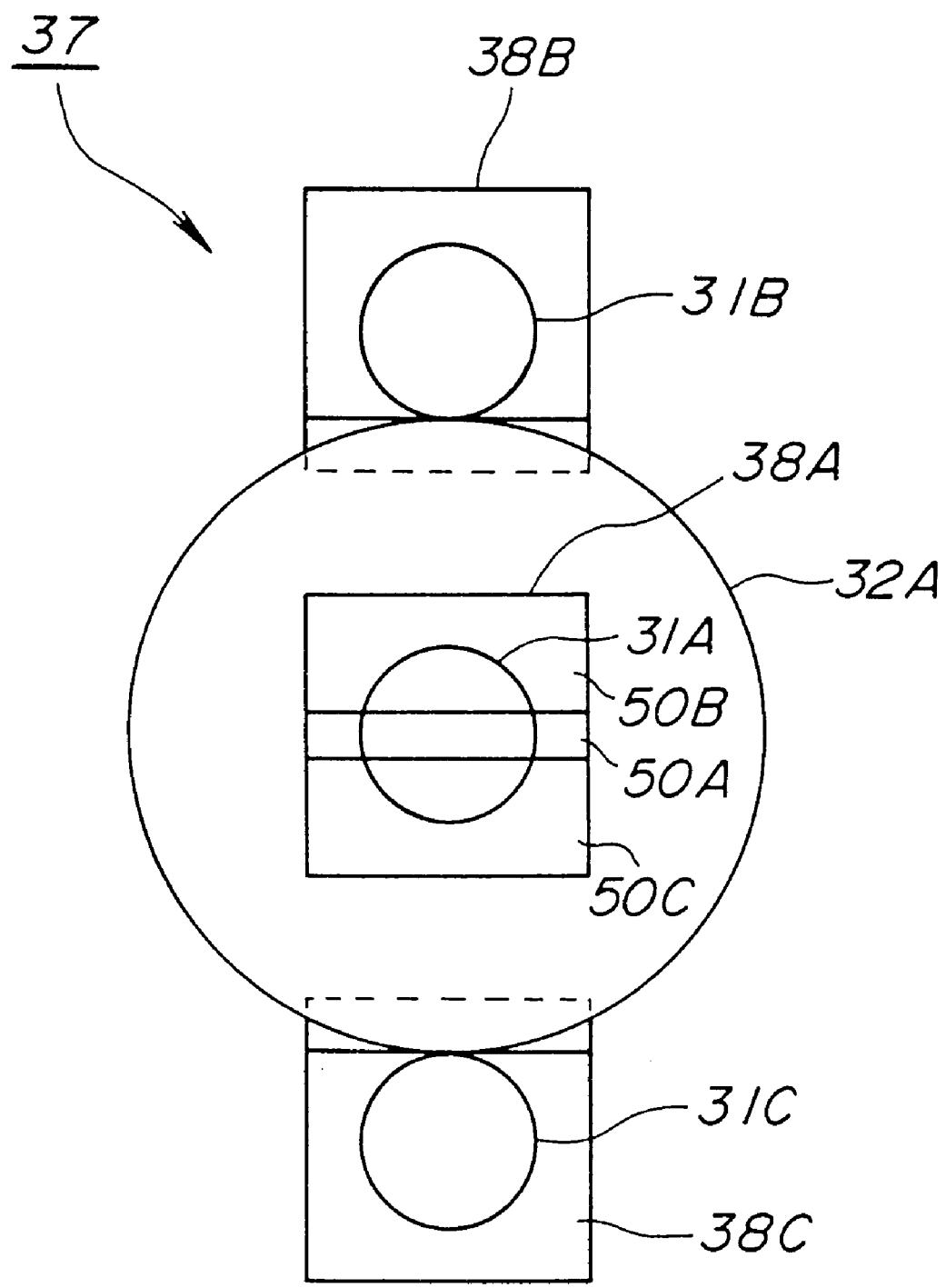
FIG. 11 is a plan view showing a photo-detector provided in an optical pick-up device according to a fourth embodiment of the present invention.

A photo-detector 37 of the optical pick-up device includes, as shown in FIG. 11, a main beam detector 38A and first and second side beam detectors 38B and 38C disposed adjacent to the main beam detector 38A on the opposite sides thereof such that the main beam detector 38A is interposed therebetween.

As shown in FIG. 11, the main beam detector 38A has a light-receiving surface which is divided into three strip-like light-receiving regions disposed in parallel with each other and composed of first, second and third light-receiving regions 50A, 50B and 50C. The first and second side beam detectors 38B and 38C used in this embodiment each have a single non-separated light-receiving region.

The light-receiving region of the first side beam detector 38B has a cut-out portion on a side facing the main beam detector 38A where the stray light 32A attributed to the main beam and directed to the main beam detector 38A might be radiated over the side beam detector in an overlapped relation to the side beams. Similarly, the light-receiving region of the second side beam detector 38C has a cut-out portion on a side facing the main beam detector 38A where the stray light 32A attributed to the main beam and directed to the main beam detector 38A might be radiated over the side beam detectors in an overlapped relation to the side beams.

In the afore-mentioned arrangement of the optical pick-up device according to the fourth embodiment of the present invention, since a part of each light-receiving surface of the first and second side beam detectors 38B and 38C which faces the main beam detector 38A, is cut out to avoid the overlapped radiation of the stray light 32A attributed to the main beam, each side beam detector is effectively prevented from being adversely affected by the stray light 32A attributed to the main beam.

Meanwhile, in the afore-mentioned optical pick-up devices according to the preferred embodiments of the present invention, the focusing error signal is detected by using an astigmatism method or a differential concentric circles method. However, the detection of the focusing error signal can be also performed by using Foucault's method, a critical angle method, a knife-edge method, or the like.

Industrial Applicability

As described above, the optical pick-up device according to the present invention includes a light source for emitting a light beam to be radiated toward a multi-layer optical disc having a plurality of information signal storage layers which are disposed in an overlapped manner and on each of which a desired information signal is recorded, an optical system for dividing the light beam emitted from the light source into three separate beams composed of a main beam and first and second side beams and radiating these beams onto the multi-layer optical disc, a main beam-receiving member for receiving the main beam reflected from the multi-layer optical disc, a first side beam-receiving member for receiving the first side beam reflected from the multi-layer optical disc, a second side beam-receiving member for receiving the second side beam reflected from the multi-layer optical disc, and a means for outputting a detection signal indicative of a quantity of light in response to the light quantity received by the first and second side beam detectors. Further, the first side beam detector and the second side beam detector are disposed spaced by a given distance apart from the main beam detector at positions where no interference with the main beam reflected from an unfocused information signal storage layer of the multi-layer optical disc, is caused. As a result, the light beam reflected from the unfocused information signal storage layer of the multi-layer optical disc, does not have any influence on the function of the device. Accordingly, a desired information signal can be accurately reproduced from the intended information signal storage layer on which the information signal is recorded.

What is claimed is:

1. An optical pick-up device for a multi-layer optical disc comprising:

a light source for emitting a light beam to be radiated toward said multi-layer optical disc having a plurality of information signal storage layers which are arranged in an overlapped manner and on each of which a desired information signal is recorded;

an optical means for dividing the light beam emitted from the light source into three separate beams composed of a main beam and first and second side beams and radiating these beams onto the multi-layer optical disc;

a main beam-receiving means for receiving the main beam reflected from the multi-layer optical disc;

a first side beam-receiving means for receiving the first side beam reflected from the multi-layer optical disc;

a second side beam-receiving means for receiving the second side beam reflected from the multi-layer optical disc; and a means for outputting a detection signal indicative of a quantity of light in response to the light quantity received by each of the main beam-receiving means, the first side beam-receiving means and the second side beam-receiving means, said first side beam-receiving means and said second side beam-receiving means being spaced a distance apart from said main beam-receiving means so that no interference with said first and second side beam-receiving means results from the main beam reflected from an unfocused information signal storage layer of the multi-layer optical disc which is incident on said main beam-receiving means.

2. An optical pick-up device for a multi-layer optical disc as claimed in claim 1, wherein said optical means for dividing the light comprises a diffraction grating, said diffraction grating dividing the light beam emitted from the light source into said three separate beams which are spaced apart from each other by such a distance that the main beam reflected from an unfocused information signal storage layer does not interfere with said first side beam-receiving means and said second side beam-receiving means.

3. An optical pick-up device for a multi-layer optical disc as claimed in claim 1, wherein detection of a focusing error is conducted based on a detection output from said main beam-receiving means.

4. An optical pick-up device for a multi-layer optical disc as claimed in claim 3, further comprising an optical element for generating an astigmatism.

5. An optical pick-up device for a multi-layer optical disc as claimed in claim 1, wherein detection of a tracking error is conducted based on a detection output from said first side beam-receiving means and said second side beam-receiving means.

6. An optical pick-up device for a multi-layer optical disc as claimed in claim 1, wherein said first side beam-receiving means and said second side beam-receiving means each have a cut-out portion on a side adjacent to said main beam-receiving means to prevent any of said main beam reflected from an unfocused information signal storage layer from being incident on said first and second side beam-receiving means.

7. An optical pick-up device for a multi-layer optical disc as claimed in claim 5, wherein said tracking error is equal to a difference between a quantity of light received by said first side beam-receiving means and said second side beam-receiving means.

8. An optical pick-up device for a multi-layer optical disc as claimed in claim 1, further comprising an optical element interposed between said light source and said main beam-receiving means, wherein said optical element causes an astigmatism between light of said main beam reflected from a focused information signal storage layer and from said unfocused information signal storage layer.

9. An optical pick-up device for a multi-layer optical disc comprising:

a light source for emitting a light beam to be radiated toward said multi-layer optical disc having a plurality of information signal storage layers which are arranged in an overlapped manner and on each of which a desired information signal is recorded;

an optical means including a diffraction grating for dividing the light beam emitted from the light source into three separate beams composed of a main beam and first and second side beams, and an objective lens for radiating the three separate beams divided by the diffraction grating onto the multi-layer optical disc in such a manner that the respective beams are focused on an information signal storage layer of the multi-layer optical disc;

a main beam-receiving means for receiving the main beam reflected from the multi-layer optical disc;

a first side beam-receiving means for receiving the first side beam reflected from the multi-layer optical disc;

a second side beam-receiving means for receiving the second side beam reflected from the multi-layer optical disc; and a means for outputting a detection signal indicative of a quantity of light in response to the light quantity received by each of the main beam-receiving means, the first side beam-receiving means and the second side beam-receiving means, said first side beam-receiving means and said second side beam-receiving means being spaced a distance apart from said main beam-receiving means so that no interference with said first and second side beam-receiving means results from the main beam reflected from an unfocused information signal storage layer of the multi-layer optical disc which is incident on said main beam-receiving means.

10. An optical pick-up device for a multi-layer optical disc as claimed in claim 9, wherein said diffraction grating divides the light beam emitted from the light source into said three separate beams which are spaced apart from each other by such a distance that the main beam reflected from an unfocused information signal storage layer causes no interference with said first side beam-receiving means and said second side beam-receiving means.

11. An optical pick-up device for a multi-layer optical disc as claimed in claim 9, wherein detection of a focusing error is conducted based on a detection output from said main beam-receiving means.

12. An optical pick-up device for a multi-layer optical disc as claimed in claim 9, wherein detection of a tracking error is conducted based on a detection output from said first side beam-receiving means and said second side beam-receiving means.

13. An optical pick-up device for a multi-layer optical disc as claimed in claim 11, further comprising an optical element for generating an astigmatism.

14. An optical pick-up device for a multi-layer optical disc as claimed in claim 9, wherein said first side beam-receiving means and said second side beam-receiving means each have a cut-out portion on a side adjacent to said main beam-receiving means to prevent any of said main beam reflected from an unfocused information signal storage layer from being incident on said first and second side beam-receiving means.

15. An optical pick-up device for a multi-layer optical disc comprising:

a light source for emitting a light beam to be radiated toward said multi-layer optical disc having a plurality of information signal storage layers which are arranged in an overlapped manner and on each of which a desired information signal is recorded;

an optical means including a diffraction grating for dividing the light beam emitted from the light source into three separate beams composed of a main beam and first and second side beams, an objective lens for radiating the three separate beams divided by the diffraction grating onto the multi-layer optical disc in such a manner that the respective beams are focused on the information signal storage layer of the multi-layer optical disc, and a polarizing beam splitter on which the light beam reflected from the multi-layer optical disc is incident;

first and second photo-detectors each having a main beam-receiving means for receiving the main beam reflected from the multi-layer optical disc and transmitted through or reflected on said polarizing beam splitter, a first side beam-receiving means for receiving the first side beam reflected from the multi-layer optical disc and transmitted through or reflected on said polarizing beam splitter, and a second side beam-receiving means for receiving the second side beam reflected from the multi-layer optical disc and transmitted through or reflected on said polarizing beam splitter; and a means for outputting a detection signal indicative of a quantity of light in response to the light quantity received by each of the main beam-receiving means, the first side beam-receiving means and the second side beam-receiving means provided on each of said first and second photo-detectors, said first side beam-receiving means and said second side beam-receiving means, provided on each of said first and second photo-detectors, being spaced a distance apart from said main beam-receiving means so that no interference with said first and second side beam-receiving means results from the main beam reflected from an unfocused information signal storage layer of the multi-layer optical disc which is incident on said main beam-receiving means.

16. An optical pick-up device for a multi-layer optical disc as claimed in claim 15, wherein said diffraction grating divides the light beam emitted from the light source into said three separate beams which are spaced apart from each other by such a distance that the main beam reflected from an unfocused information signal storage layer causes no interference with said first side beam-receiving means and said second side beam-receiving means.

17. An optical pick-up device for a multi-layer optical disc as claimed in claim 15, wherein detection of a focusing error is conducted based on a detection output from said main beam-receiving means provided on each of said first and second photo-detectors.

18. An optical pick-up device for a multi-layer optical disc as claimed in claim 15, wherein detection of a tracking error is conducted based on a detection output from said first side beam-receiving means and said second side beam-receiving means provided on each of said first and second photo-detectors.

19. An optical pick-up device for a multi-layer optical disc as claimed in claim 15, wherein said main beam-receiving means provided on each of said first and second photo-detectors is divided into three light-receiving members.

20. An optical pick-up device for a multi-layer optical disc as claimed in claim 18, wherein said tracking error is equal to $(E14+E15)-(E16+E17)$, where:

E14 is a quantity of light received by said first side beam-receiving means of said first photo-detector;

E15 is a quantity of light received by said first side beam-receiving means of said second photo-detector;

E16 is a quantity of light received by said second side beam-receiving means of said first photo-detector; and E17 is a quantity of light received by said second side beam-receiving means of said second photo-detector.

* * * * *